(12) United States Patent
Blackburn (10) Patent No.: US 9,728,100 B2
(45) Date of Patent: Aug. 8, 2017

(54) HAZARD SUPPRESSION TRAINING SIMULATOR AND METHOD OF TRAINING

(75) Inventor: John Joseph Blackburn, Squamish (CA)

(73) Assignee: LION GROUP, INC., Dayton, OH (US)

( * ) Notice: Subject to any disclaimer, the term of this patent is extended or adjusted under 35 U.S.C. 154(b) by 1712 days.

(21) Appl. No.: 12/361,183

(22) Filed: Jan. 28, 2009

(65) Prior Publication Data

US 2009/0197229 A1 Aug. 6, 2009

Related U.S. Application Data (60) Provisional application No. 61/063,115, filed on Feb. 1, 2008.

(51) Int. Cl.
*G09B 19/00* (2006.01)

(52) U.S. Cl.
CPC .................................. *G09B 19/00* (2013.01)

(58) Field of Classification Search
CPC ... A62C 99/0009; A62C 99/0081; A62C 2/00; G09B 19/00; G09B 9/00
USPC ......... 434/219, 226; 40/428; 169/44, 45, 46, 169/47
See application file for complete search history.

(56) References Cited

U.S. PATENT DOCUMENTS

| | | | |
|---|---|---|---|
| 3,285,159 A * | 11/1966 | Greene | ............................ 99/343 |
| 4,001,949 A | 1/1977 | Francis | |
| 4,303,396 A | 12/1981 | Swiatosz | |
| 4,526,548 A | 7/1985 | Livingston | |
| 4,592,730 A | 6/1986 | Knight et al. | |
| 4,611,993 A | 9/1986 | Brown | |
| 4,983,124 A | 1/1991 | Ernst et al. | |
| 5,059,124 A | 10/1991 | Tsujita | |
| 5,233,869 A | 8/1993 | Rogers et al. | |
| 5,316,484 A * | 5/1994 | Layton et al. | ................. 434/226 |
| 5,335,559 A * | 8/1994 | Rogers et al. | ................... 73/866 |
| 5,447,437 A | 9/1995 | Joynt et al. | |
| 5,518,403 A | 5/1996 | Luftig et al. | |
| 5,580,146 A * | 12/1996 | Maslow | .......................... 353/74 |

(Continued)

FOREIGN PATENT DOCUMENTS

| | | |
|---|---|---|
| FR | 2714197 A1 | 6/1995 |
| FR | 2745502 A1 | 9/1997 |
| FR | 2745503 A1 | 9/1997 |

*Primary Examiner* — Bruk Gebremichael
(74) *Attorney, Agent, or Firm* — Thopmpson Hine LLP (57) ABSTRACT

A hazard-suppression training simulator for training, for example, first responders, is provided. The simulator includes a housing; at least one source of sensation (for example, a visual or an audio sensation) representing a hazardous condition, for example, a fire; at least one sensor adapted to detect a simulated or an actual hazardous condition suppressant; and a controller adapted to vary the sensation in response to the simulated or the actual suppressant detected by the at least one sensor. The simulator may also include one or more "props" to better simulate an actual hazardous conditions, for example, a trash can or a stove pot that is on fire. The simulated suppressant may be provided by a simulated fire extinguisher, for example, a simulated extinguisher emitting an electromagnetic or sonic signal representing a fire suppressant. A hazard-suppression training method employing this simulator is also disclosed.

36 Claims, 5 Drawing Sheets

(56) References Cited

U.S. PATENT DOCUMENTS

| | | | |
|---|---|---|---|
| 5,752,835 A | 5/1998 | Whitmer, Sr. | |
| 5,823,784 A * | 10/1998 | Lane | 434/226 |
| 5,924,784 A | 7/1999 | Chiliwnyj et al. | |
| 5,927,990 A | 7/1999 | Welch et al. | |
| 5,954,517 A * | 9/1999 | Hagenlocher | 434/365 |
| 6,003,608 A * | 12/1999 | Cunningham | 169/46 |
| 6,047,489 A | 4/2000 | Hess et al. | |
| 6,129,552 A | 10/2000 | Deshoux et al. | |
| 6,317,266 B1 | 11/2001 | Yoshimura et al. | |
| 6,363,636 B1 | 4/2002 | Hess et al. | |
| 6,599,127 B1 | 7/2003 | Hopmeier | |
| 6,677,935 B2 | 1/2004 | Kobayashi et al. | |
| 6,688,752 B2 | 2/2004 | Moore | |
| 6,780,014 B1 | 8/2004 | Hull et al. | |
| 6,869,363 B2 | 3/2005 | Okitsu et al. | |
| 7,175,439 B2 | 2/2007 | Darois et al. | |
| 2004/0016348 A1* | 1/2004 | Sharpe | 99/331 |
| 2004/0191736 A1 | 9/2004 | Werhun | |
| 2005/0202379 A1 | 9/2005 | Darois et al. | |
| 2005/0233289 A1 | 10/2005 | Hoglund | |
| 2007/0107915 A1* | 5/2007 | Bennett | 169/62 |
| 2007/0218436 A1 | 9/2007 | Blackburn et al. | |
| 2009/0197229 A1 | 8/2009 | Blackburn | |

* cited by examiner

HAZARD SUPPRESSION TRAINING SIMULATOR AND METHOD OF TRAINING

CROSS-REFERENCE TO RELATED APPLICATION

This application claims priority from U.S. Provisional Patent Application 61/063,115, filed on Feb. 1, 2008, the disclosure of which is included by reference herein in its entirety.

TECHNICAL FIELD

The present invention relates to hazardous condition suppressing training devices, for example, fire suppressant training simulators. In particular, aspects of the invention provide devices and methods for training personnel on the proper methods and techniques for suppressing hazardous condition, such as, fires, gas leaks, toxic spills, and the like, with little or no danger to the trainee. Aspects include simulators that simulate the hazardous conditions while monitoring the effectiveness of the trainee's hazard suppressing method and technique.

BACKGROUND OF THE INVENTION

Currently there is a large number of, what the fire industry refers to as, "props" used as live fire training aids. These props typically consist of a fire proof material, such as, steel, formed into the shape of a commonly encountered burning object, such as, a paint locker, electric motor, trashcan, stove pot, and the like. Typically, propane or natural gas flames are then sent through these props to mimic the effect of the props being on fire. Depending upon the training situation and specific prop, an extinguishant, most typically water, is sprayed on the prop using sound fire fighting techniques and, depending on whether the prop flame is operator controller or is electronically controlled with sensors, the fire that appears to be originating from the prop dies down or is extinguished.

The prior art also include fire training systems that generate images of flames on a screen or using a plurality of light sources to generate the illusion of fire, for example, on a flat surface. See, for example, applicant's co-pending U.S. application Ser. No. 11/369,303 filed on Mar. 7, 2006 and published as U.S. Published application 2007/0218436 on Sep. 20, 2007, the disclosure of which is included by reference herein. Some of these systems can also include interactivity for training purposes such as the ability to receive some type of input from an actual or simulated type of fire extinguishing device, such as, a real or simulated fire extinguisher. Some of these systems also incorporate external influences as inactive items such as, pull stations, power disconnect panels, alarms, telephones, smoke machines, etc., that respond in conjunction with the simulated fire on the screen or influence its progress. However, these and other related prior art systems fail to provide a truly three-dimensional interaction and training experience for the trainee: the prior art typically only provides a simulated two-dimensional training experience. Aspects of the present invention address this disadvantage of the prior art.

SUMMARY OF THE INVENTION

Aspects of the present invention address the limitations and disadvantages of the prior art by providing hazard suppression training simulators having training props that more accurately simulate real-life hazardous conditions, for example, by providing three-dimensional training props. Aspects of the invention include light sources, for example, a single or a plurality of light sources, that create the appearance or illusion of an actual fire originating from within or about an object. In addition, aspects may include the release of smoke, for example, proportional to the fire, and optionally sound effects to create a more realistic appearance of an object being on fire. In one aspect, sensors may be provided that are adapted to detect simulated or actual hazard suppressants, for example, a simulated or actual fire extinguisher.

One aspect of the invention is a hazard suppression training simulator including or comprising a housing; at least one source of sensation (for example, visual, audio, smoke, fluid, sound, heat, smell, solid material, and lights, among other humanly sensible sensations) representing a hazardous condition; at least one sensor adapted to detect a simulated or an actual hazardous condition suppressant; and a controller adapted to vary the sensation in response to the simulated or the actual suppressant detected by the at least one sensor. The hazardous condition may be a fire, smoke, sparks, a steam leak, a gas leak, or a toxic fluid leak, a hazardous fluid leak, or a oxidizing gas leak, among other hazardous conditions. In one aspect, the training similar may simulate a condition that may promote or lead to one or more of the above hazardous conditions, for example, exposed electrical wires that may lead to fire ignition or a compromised or weakened pipe that is about to burst, among other conditions. In one aspect, the simulator may further include a prop mounted to the housing and positioned to receive the sensation from the source of sensation, for example, a device, machinery, hardware, furniture, a container, a structure, an accumulation, or an enclosure. In one aspect, a plurality of props may be provided which may be interchangeably mounted to the housing. In another aspect, the simulator may further include a display panel adapted to display a hazardous condition.

Another aspect of the invention is a hazard suppression training method including or comprising: providing a hazard suppression training simulator as recited above to provide a simulated hazardous condition; providing a simulated or actual hazard suppression apparatus providing a simulated or an actual hazard suppressant; directing the simulated or actual hazard suppressant toward the simulator wherein the at least one sensor detects the suppressant; and modifying the simulated hazardous condition in response to the suppressant detected by the at least on one sensor. In one aspect of the invention, the simulated hazard suppression apparatus comprises a simulated fire extinguisher, a simulated fire hose, a simulated fire blanket, or the actual hazard suppression apparatus may be an actual fire extinguisher, fire hose, or fire blanket. The actual hazard suppressant may be water, carbon dioxide, Halon, a cloth or blanket, a powdered chemical, a foam, air, an aerosol, or combinations thereof. The simulated hazard suppressant may be an audible signal, an electromagnetic signal, an ultrasonic signal, a pressure signal, a heat signal, a particulate signal, a fluid signal, a gas vapor signal, or a combination thereof.

These and other aspects, features, and advantages of this invention will become apparent from the following detailed description of the various aspects of the invention taken in conjunction with the accompanying drawings

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

DETAILED DESCRIPTION OF THE INVENTION

Features of the hazard suppression training simulator and hazard suppression training method according to aspects of the invention will be apparent from the following detailed description.

Figure 1:
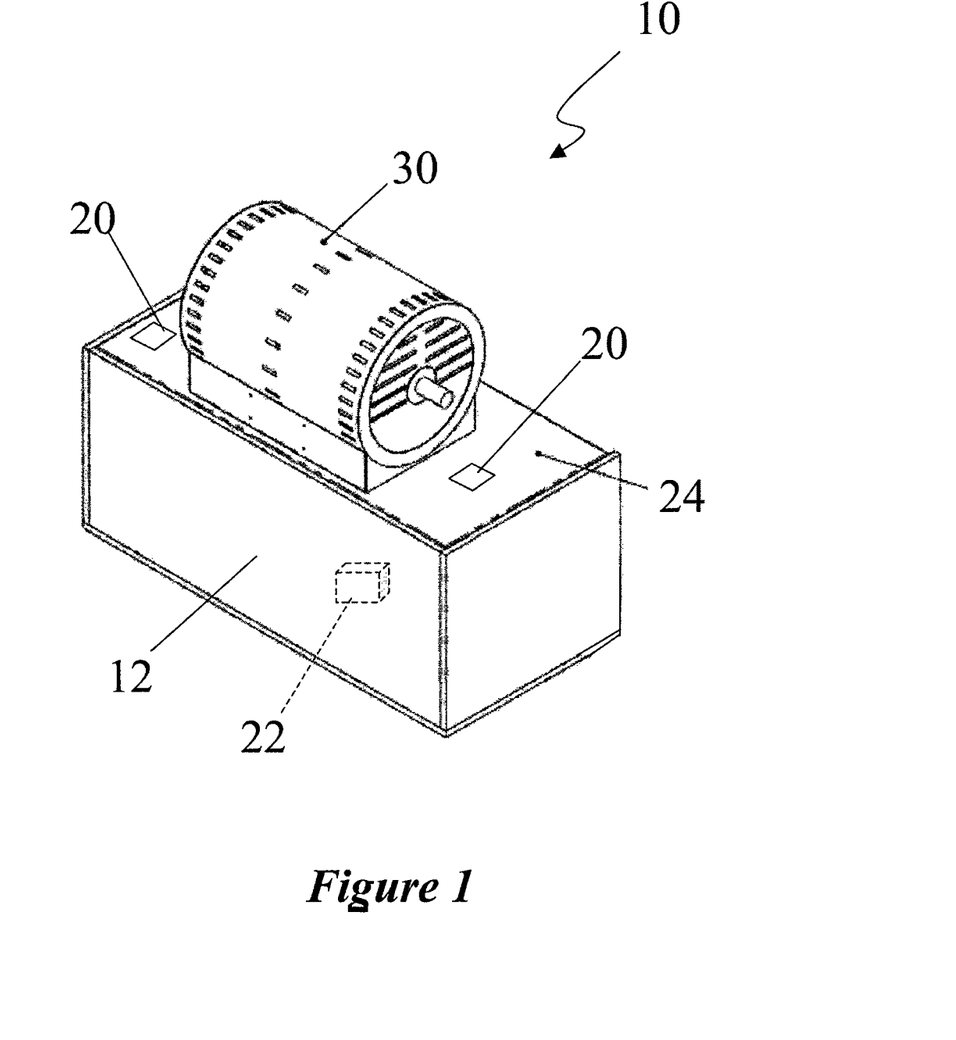
FIG. 1 is a perspective view of a hazard suppression training simulator according to one aspect of the invention.
Figure 2:
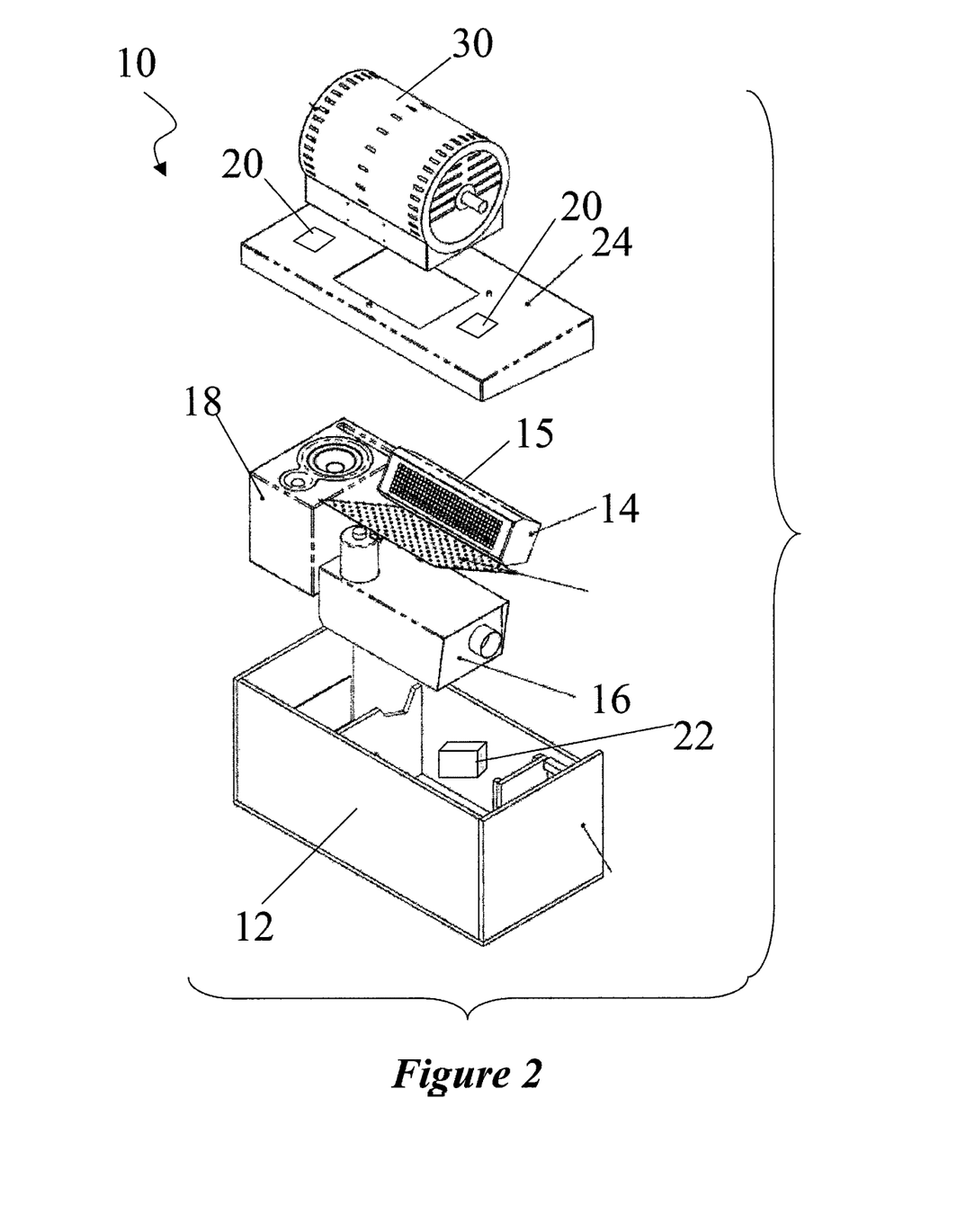
FIG. 2 is an exploded perspective view of the training simulator shown in FIG. 1.

FIG. 1 is a perspective view of a hazard-suppression training simulator 10 according to one aspect of the invention. FIG. 2 is an exploded perspective view of the training simulator 10 shown in FIG. 1. As shown in FIGS. 1 and 2, training simulator 10 typically includes a housing 12, at least one source of sensation 14, 16, and/or 18, for example, a visual, audio, smoke, fluid (gas or liquid), sound, heat, solid materials, smells, lights, etc., representing a hazardous condition, for example, a fire; at least one sensor 20 adapted to detect a simulated or an actual hazardous condition suppressant; and a controller 22 (shown in phantom in FIG. 1) adapted to vary the sensation produced by the source of sensation 14, 16, and/or 18 in response to the simulated or the actual suppressant detected by the at least one sensor 16. As shown, housing 12 may include a top or cover 24.

Though housing 12 is shown as a parallelepiped, that is, a rectangular box, in FIGS. 1 and 2, housing 12 may assume any convenient shape suitable to enclose or accommodate one or more sources of sensation 14, 16, and/or 18. For example, housing 12 may be circular cylindrical, rectangular cylindrical, square, spherical, hemispherical, or pyramidal, among other shapes.

Sources of sensation 14, 16, and/or 18 may be any source of sensation that an be used to simulate a hazardous condition, for example, a source of light, sound, smoke, fluid, smell, heat, etc. For example, as shown in FIG. 2, source 14 may be one or more sources of light simulating a fire or sparks. In one aspect, source of light 14 may be one or more sources of light, for example, one or more sources of colored light, for instance, to simulate the red, yellow, and orange hues of a flame. In addition, source of light 14 may vary the light provided to simulate an active fire, for example, a roaring or a raging fire. One or more sources of light 14 may include a least one source of light, but typically, employs a plurality of light sources, for example, a plurality of light sources located in housing 12, for instance, evenly distributed about the inside of housing 12 or evenly distributed about a light display panel 15. In another aspect, source of light 14 may comprise light guides, a CRT, a monitor, for example, flat screen monitor, or a liquid crystal display, among other types of displays, upon which a varying light pattern may be displayed. Light source 14 may be mounted on one or more panels 15 mounted in housing 12, for example, by means of conventional mechanical fasteners. Light sources 14 may comprise incandescent lights, fluorescent lights, electroluminescent lights (that is, "EL" lights), plasma lights, lasers, or light emitting diodes (LEDs). In one aspect of the invention, panels 15 may be printed circuit boards (PCBs) and light sources 14 may comprise a plurality of LEDs mounted to PCBs. In one aspect, light panel 15 may include from about 1 to over 5 million light sources, for example, LEDs evenly distributed about one or more PCBs. One such panel may be a light panel having part number FPP-1 provided by BullEx Digital Safety of Menands, N.Y., or its equivalent.

As also shown in FIG. 2, source of sensation 16 may be a source of smoke simulating a fire, an incipient fire, a smoldering fire, or a source of hazardous or toxic fluids (including liquids or gases), for example, propane, natural gas, gasoline, kerosene, diesel, methane, carbon monoxide, oxygen, aerosol, corrosive acid, or biologically hazardous waste, among other fluids. In one aspect, source of smoke 16 may be a conventional smoke generator, for example, a smoke generator marketed under the name Alpha 900, by Rosco, though any conventional smoke generator may be used. In one aspect, the quantity or character of the smoke generated may vary depending upon the simulated source of the smoke or depending upon the suppressant, extinguishant, or simulated suppressant or extinguishant applied to training simulator 10. For example, large amounts of smoke may be emitted when a specific extinguishing or suppressing method is used.

Another source of sensation 18 may be any source of sound, for example, one or more electrical speakers 18. For example, speakers 18 may be a source of audible sound simulating a hazardous condition, for example, the zapping, crackling, smothering, etc. of a fire, the hissing sound of a gas leak, the sound of a fluid leak, the sound of steam on hot metal, and/or the sound of impact of a simulated or actual suppressant or extinguishant upon the simulated hazardous condition. The source of sound 18 may be coordinated with a source of light 14 and the source of smoke 16 to more realistically simulate the hazardous condition.

Sensors 20 may be any type of sensor adapted to detect the presence of a simulated or actual hazard suppressant or extinguishant and generate an electrical signal corresponding to the presence of the suppressant or extinguishant. According to aspects of the invention, sensor 20 may be adapted to detect any stimulus emitted by a simulated or actual suppressing agent, for example, a real or simulated fire extinguisher. For example, one or more sensors 20 may be adapted to detect a wavelength of radiation within the electromagnetic spectrum, for example, visible light, radio waves, or microwaves; a pressure wave, for example, a sonic signal, for example, an ultrasonic signal or an audible signal, for example, simply the noise generated by a suppressing agent being dispensed, a voice command from a trainer to a trainee, or a wave of air; a fluid emitted by a suppressing agent, for example, a fire extinguishing agent, such as water, an air-water mixture, carbon dioxide, sodium bicarbonate, cornstarch, or a combination thereof; a fluid simulating an extinguishant; a sold, for example, a solid particulate; and combinations thereof. The class of radiation within the electromagnetic spectrum that may be detected by sensors 20 includes, but is not limited to, ultraviolet (UV), visible, infrared (IR), far infrared, microwaves, and radio frequency (RF), and combinations thereof. According to the present invention, the term "sonic" includes any stimulus transmitted by compression waves in a medium, such as air, for example, from the infrasonic waves, to audible waves (about 20 to about 20,000 Hz), to ultrasonic waves. In one aspect of the invention, sensor 20 may comprise an ultrasonic sensor, for example, a piezoelectric ultrasonic sensor provided by Murata Manufacturing Company, or its equivalent.

In one aspect, the one or more sensors 20 may also be adapted to detect audible directives, for example, verbal directives from a trainee or a trainer. Audible directives may include but are not limited to oral/verbal directives given by a trainee or a trainer or by an artificial voice synthesized/digital voice. Sensors 20 or simulator 10 in general may also be adapted to receive electronic-based directives or orders, such as those that can be given by a computer, a minicomputer, a remote device, or a personal digital assistant (PDA). In addition to the pressure waves mentioned above, in one aspect, sensors 20 may be adapted to detect wave patterns, for example, repeating patterns of high pressure and low pressure regions moving through a medium, for instance, as can be provided by sound patterns or vibration patterns emitted by a fire suppressing device, such as a fire extinguisher, or its equivalent.

According to aspects of the invention, the simulated hazardous condition effected by the sources of sensation 14, 16, and/or 18 may be regulated or controlled by controller 22, for example, in response to the suppressant detected by the one or more sensors 20. For example, controller 22 may be used to vary the operation of the sources of sensation 14, 16, and/or 18 to simulate the effect of applying an extinguishant or a simulated extinguishant onto a simulated fire in or about prop 30, for example, displaying a diminished or extinguishing fire when the extinguishant is applied correctly or an enhanced or enraging fire, for example, when the extinguishant is applied incorrectly. Though no electrical connections are illustrated in FIGS. 1 and 2, it will be understood that sources of sensation 14, 16, and 18, sensors 20, and controller 22 may typically be powered by conventional means, for example, plugged into a wall outlet, and may be connected and communicate via wires or cables, or wirelessly. Controller 22 may be any conventional electronic controlling device, such as, a computer, a programmable logic controller (PLC), a microprocessor (such as, an embedded microprocessor), or a networked control device, among others. Controller 22 may typically have a user interface, not shown, for example, a keyboard or hand held input device for varying or controlling the operation simulator 10. Controller 22 may comprise a 56800 series Microcontroller/DSP Hybrid controller provided by Motorola, or its equivalent. Controller 22 may include a display and may include one or more shift register drivers to drive the operation of the sources of sensation 14, 16, and/or 18.

According to one aspect of the invention, hazard suppression training simulator 10, may include one or more "props" 30. As used herein and in the attached claims, a prop may comprise any device or structure associated with the hazardous condition. For example, props may be live fire training aids, that is, objects, devices, containers, and the like, that are on fire. These props may include, but are not limited to, simulated or real machinery, such as, an engine, a pump, a parts washer, a stove, or a furnace; an electric device, such as, an electric motor, a generator, an electrical panel, or electronic equipment, for example, a computer; an enclosure, such as, cabinet, a shelf, a locker, or a paint locker; a container, such as, a box, a can, a trashcan, a stove pot, a tank, a storage drum, an electrical enclosure, or a vessel; a piece of hardware, for example, a valve, a pipe, a pipe flange, or a pipe fitting (for example, a piece of hardware or container that may be leaking a fluid, such as, steam or a toxic fluid), a manifold, a pipe sensor, a hose, or a cable, among others; furniture, for example, a bed, a table, a chair, or a dresser; a household item; or a home and garden item, for example, a deck section, a window, a wall section, a roof section, a gutter, an accumulation or collection of material (for example, a pile of sticks, a pile of leaves, or a pile of brush), or one or more trees, among other simulated or real objects or structures associated with a hazardous condition. In the aspect of the invention shown in FIGS. 1 and 2, prop 30 comprises an electric motor for the sake of illustration, but any of the props mentioned above may be used.

In one aspect, prop 30 may be made of a fireproof material, such as, steel, but may also be flammable, such as, made of plastic or wood. According to aspects of the present invention, the one or more props 30 may be mounted to housing 12 and positioned to receive the sensation from one or more of the sources of sensation 14, 16, and/or 18, for example, to simulate the prop 30 being engulfed in flame. In one aspect of the invention, the one or more props 30 may be removably mounted to the housing, for example, whereby a plurality of props may be interchangeably mounted to housing 12. In one aspect, the one or more props 30 may be removably mounted to housing 12 whereby a plurality of training experiences can be provided, for example, a first training exercise on a first prop and a second training exercise on a second, different prop.

Figure 3:
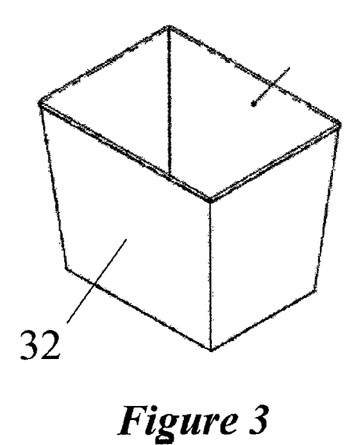
FIGS. 3, 4, 5, and 6 are perspective views of various props that can be used in the simulator shown in FIG. 1 according to aspects of the invention.
Figure 4:
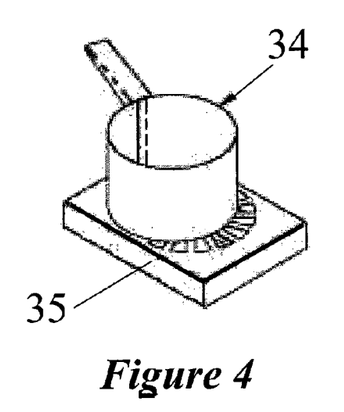
Figure 5:
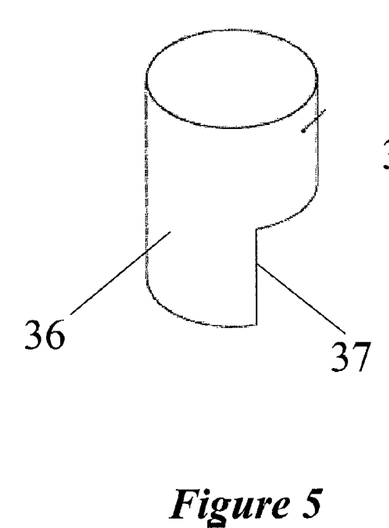
Figure 6:
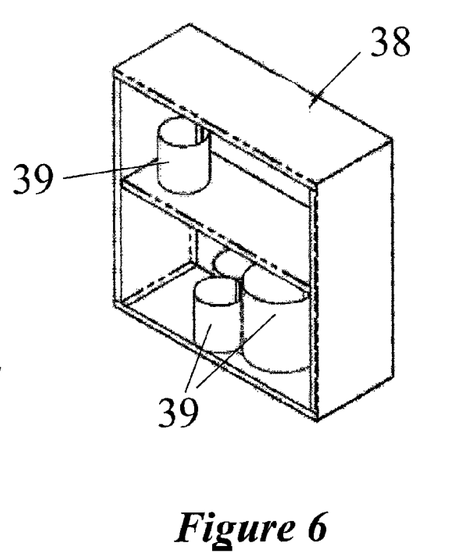

FIGS. 3, 4, 5, and 6 are perspective views of various props that can be used in the simulator 10 shown in FIGS. 1 and 2 according to aspects of the invention. FIG. 3 illustrates a wastebasket or trashcan 32 that may be used as a prop for simulator 10, for example, to simulate a fire in a wastebasket. FIG. 4 illustrates a pot 34 that may be used as a prop for simulator 10, for example, to simulate a fire in a pot 34 resting on a burner 35. FIG. 5 illustrates a barrel 36 that may be used as a prop for simulator 10, for example, to simulate a fire in barrel 36. As shown in FIG. 5, barrel prop 36 may be modified to accommodate mounting on housing 12, for example, having a cutout 37 to accommodate the geometry of housing 12. FIG. 6 illustrates a paint locker 38 that may be used as a prop for simulator 10, for example to simulate a fire in paint locker 38 having one or more paint cans 39. It will be apparent to those of skill in the art that other objects and devices may also be used as one or more props for simulator 10. In another aspect of the invention, at least one of the components positioned in housing 12, for example one of the sources of sensations 14, 16, and/or 18, sensors 20, and/or controller 22 may be positioned in a prop, for example, in prop 30, 32, 34, 36, or 38, where housing 12 may be reduced in size or eliminated entirely. For example, in one aspect, all the ancillary devices, for example, the sources of sensations 14, 16, and/or 18, sensors 20, and/or controller 22 may be positioned in the prop and no housing 12 may be necessary.

The simulation effected by simulator 10, for example, by means of sensors 20 and controller 22, may also be varied depending upon the prop 30 being used. For example, certain props 30 may require the use of specific fire fighting techniques while other props may require a different fire fighting technique. In one aspect, the prop 30 may be a container, for example, a cylindrical container, having a bottom and an open top, wherein the at least one sensor 20 is positioned at the bottom of the cylindrical container and is accessible only from the open top of the container. For instance, a prop 30, such as, trashcan 32 shown in FIG. 3, may require a more three-dimensional fire fighting technique to extinguish a fire. Specifically, in one aspect, when the trashcan prop 32 is used to simulate a fire, the extinguishing agent must typically be aimed into the can from above to be extinguished. According to this aspect of the invention, simulator 10 and its operation may be modified whereby the one or more sensors 20 may be positioned in the bottom of trashcan prop 32 whereby the trainee must direct the extinguishant or simulated extinguishant down into the trashcan prop 32 to extinguish the simulated fire in the trashcan prop 32. In another three-dimensional aspect, the trainee may be required to place a lid or a blanket or other sheet material over the trashcan prop 32 to extinguish the simulated fire. In order sense proper technique, trashcan prop 32 may include one or more detectors to sense the placement of the blanket or lid, for example, one or more photosensitive sensors in trashcan prop 32 or one or more proximity sensors in the open top of trashcan prop 32. Other prop-specific modifications or sensor positions will be apparent to those of skill in the art to provide the desired training experience.

Figure 7:
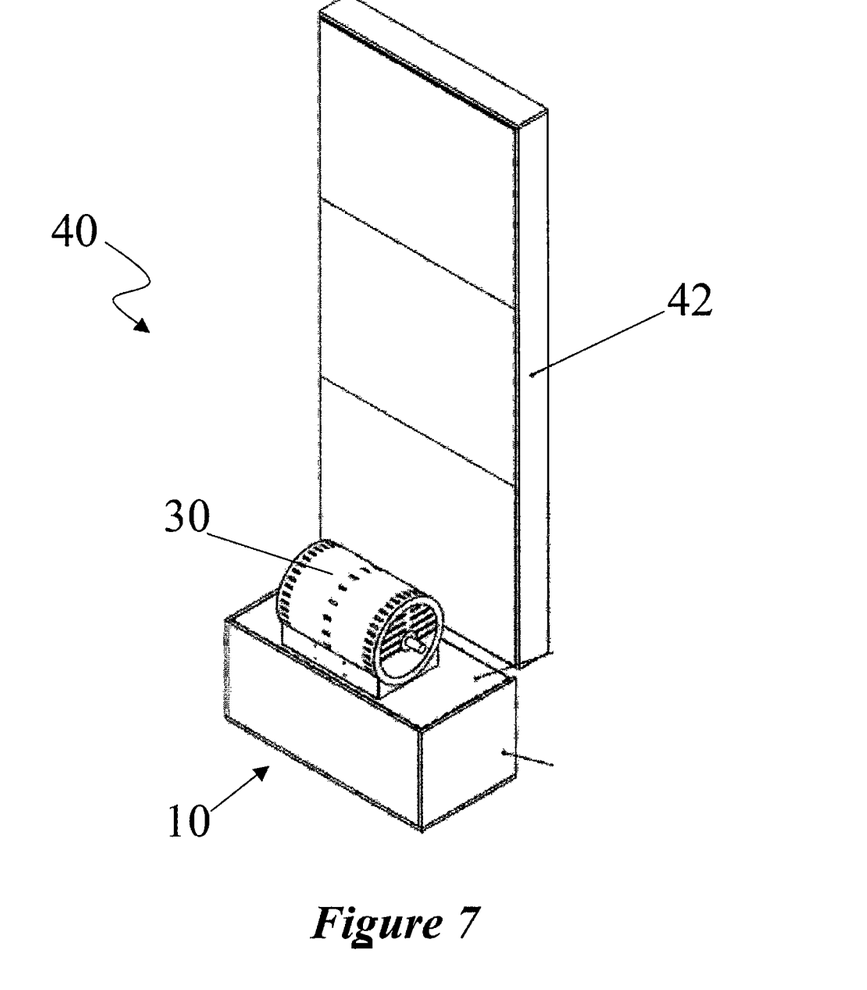
FIG. 7 a perspective view of the training simulator system having the training simulator shown in FIG. 1 and a display panel according to another aspect of the invention.

FIG. 7 a perspective view of the training simulator system 40 having simulator 10 shown in FIG. 1 and a display panel 42 according to another aspect of the invention. In one aspect of the invention, simulator 10 may be interfaced with display panel 42 to further enhance the realistic simulation of a hazardous condition, for example, a fire, flame, or steam leak, or a condition that may promote or lead to one or more of the above hazardous conditions, for example, exposed electrical wires that may lead to fire ignition or a compromised or weakened pipe that is about to burst, among other conditions. For instance, display panel 42 may be adapted to display a hazardous condition, for instance, flames emanating from a prop 30 or flames extending from trashcan 32, flames extending three or more feet above the top of trashcan 32 or a similar prop, or steam escaping from a pipe or pipe flange, among other hazardous conditions. When a display panel 42 is provided, controller 22 may be adapted to vary the hazardous condition on the display panel 42 in response to the suppressant detected by the at least one sensor 20. Display panel 42 may comprise the display panel disclosed in co-pending U.S. application Ser. No. 11/369,303 filed on Mar. 7, 2006, the disclosure of which is incorporated by reference herein in its entirety, or any other display adapted to display a hazardous condition, for example, fire, smoke, sparks, steam, etc.

In addition, display panel 42 may also be used to provide enhanced levels of interactively between simulator 10, 40 and the trainee (not shown). For example, display panel 42 may be used to display a simulation of a fire spreading from a prop 30 to an adjacent object or structure, for example, a wall or curtain, or fire spreading from an adjacent object or structure to prop 30. Display panel 42 may also be used to provide a display of the effect of the use of the simulated or real extinguishant or suppressant on the hazardous condition. For example, display panel 42 may be used to display the effect of applying an extinguishant or a simulated extinguishant onto a simulated fire in or about prop 30, for example, displaying a diminished or extinguishing fire when the extinguishant is applied correctly or an enhanced or enraging fire, for example, when the extinguishant is applied incorrectly. Display panel 42 may also display other objects or structures in the vicinity of or adjacent to prop 30, for example, hazard suppressant equipment, such as, an extinguisher or fire hose; an electric control panel; a pull station; room lighting; sprinklers; valves, such as, a gas shutoff valve; an alarm, a door or phone, among other objects or structures.

According to one aspect of the invention, simulator 10 and/or system 40 may also include simulated or actual objects or structures in the vicinity of or adjacent to housing 12 or prop 30, for example, hazard suppressant equipment, such as, an extinguisher or fire hose; an electric control panel; a pull station; room lighting; sprinklers; valves, such as, a gas shutoff valve; an alarm; simulated heat; a door; and a phone, among other real or simulated objects or structures. In one aspect, a sparking electrical device may be provided, for example, a sparking electrical box or sparking motor, and similar 10 and/or system 40 may be adapted to simulate the ignition of a prop, for example, prop 30, 32, 34, 36, 38 or a prop simulating an open parts washer container, among other props, by the sparking electrical device.

Figure 8:
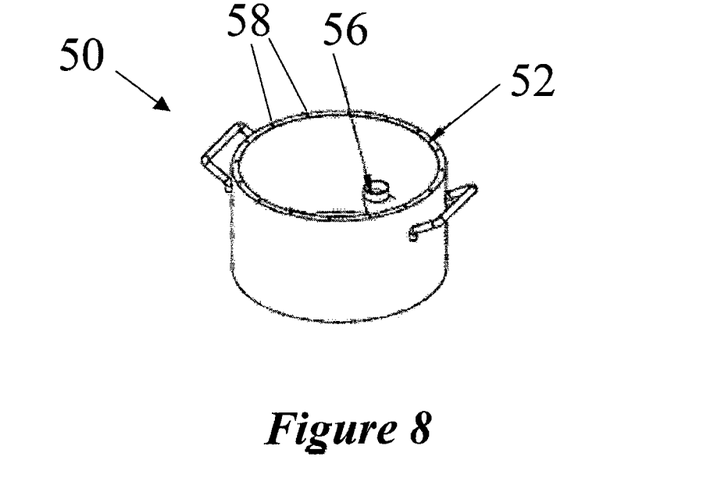
FIG. 8 is a perspective view of another training simulator according to another aspect of the invention.
Figure 9:
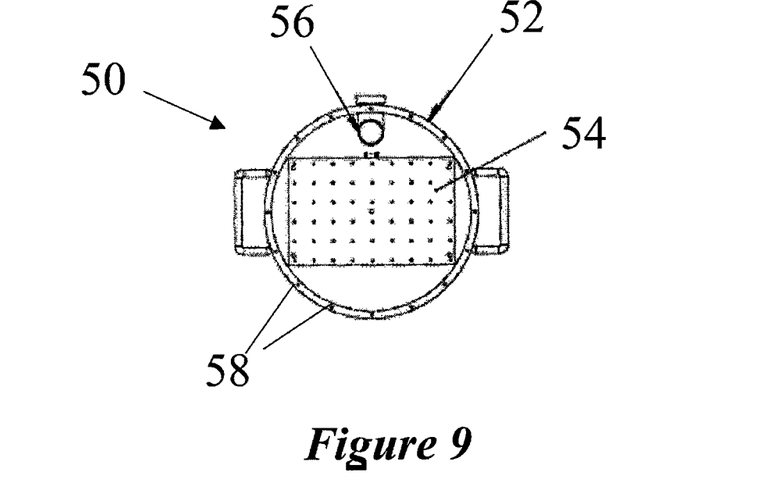
FIG. 9 is a top plan view of the aspect of the invention shown in FIG. 8.

In another aspect of the invention, instead of the prop 30 being mounted to simulator 10 as shown in FIG. 1, the sources of sensations 14, 16, and/or 18, sensors 20, and controller 30 may be positioned or embedded within the one or more props 30. This aspect of the invention may be more practical when more direct interaction with the prop or a compact size of the prop is advantageous. In addition, large props, such as, vehicles and even structures, may be instrumented with sources of sensations 14, 16, and/or 18; sensors 20; and/or a controller 22 to simulate a hazardous condition requiring suppression, for example, a fire or a toxic fluid spill. For example, FIG. 8 is a perspective view of another training simulator 50 according to another aspect of the invention. FIG. 9 is a top plan view of the aspect of the training simulator 50 shown in FIG. 8. As shown in FIGS. 8 and 9, training simulator 50 includes a pot 52 having one or more sources of sensation 54, 56, one or more sensors 58, and a controller (not shown). According to this aspect of the invention, pot 52 provides the housing for the simulator. Though in FIGS. 8 and 9 the prop is shown as a pot, it will be understood that, according to aspects of the invention, simulator 50 may employ any one or more of the props 30 described above, for example, a trashcan or an electrical cabinet. The controller may comprise any one of the controlling devices disclosed above with respect to controller 22. Sources of sensation 54 and/or 56 may comprise any one or more of the sources described above with respect to sources of sensation 14, 16, and 18. In the aspect of the invention shown in FIGS. 8 and 9, for illustration, source of sensation 54 comprises a plurality of light sources, one or more sources of sound, and/or one or more sources of smoke which combine to simulate a fire in pot 52.

Also, sensors 58 may comprise any one or more of the sensors described above with respect to sensors 20. Sensors 58 may be positioned anywhere in, on, or about pot 52, that is, wherever it is convenient to detect the presence of a suppressant, an extinguishant, or a simulated extinguishant. However, in the aspect of the invention shown in FIGS. 8 and 9, sensors 58 are positioned about the rim of pot 52 to detect the presence of an extinguishant or the presence of a suppressant adapted to smother a simulated fire in pot 52. For example, sensors 58 may be positioned about the rim of pot 52 to sense whether a trainee has properly smothered the simulated fire, for example, by means of a fire blanket or a similar smothering device, or simply by properly placing a top (not shown) on pot 52.

It will be apparent to those of skill in the art that aspects of the invention can provide an effective means for training safety personnel, for example, fire fighters and first responders, and ordinary citizens, in the proper use of hazard suppressant equipment. However, it will be understood by those of skill in the art that aspects of the invention may provide even more than simply training to put out fires;

aspects of the invention can provide means to expose the trainee to emergency scenarios that simulate actual real-life emergency environments. For example, the three-dimensional props that characterize aspects of the invention may enable the trainee to become immersed in a simulated emergency environment that better prepares the trainee for the actual real-life experience. In addition, aspects of the invention avoid the use of fossil fuels that may characterize prior art training devices and methods and aspects of the invention can minimize or avoid the need for effluent collection and disposal that may be required when employing actual suppressants, such as, fire extinguishers. Though aspects of the invention will be useful in training personnel in fire suppressant techniques, it will be apparent to those of skill in the art that aspects of the invention art not limited to training fire suppressant techniques, but can be useful in training in suppressing a broad range of hazardous conditions.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A hazard suppression training simulator comprising:
   a three dimensional housing, wherein said housing is a casing defining an interior compartment;
   at least one source of sensation positioned within said interior compartment of said housing and configured to emit a sensation externally of said housing, wherein said sensation is representative of a hazardous condition;
   at least one sensor adapted to detect a simulated or an actual hazardous condition suppressant applied to said housing externally of said interior compartment, wherein said sensor is positioned at least partially within said interior compartment of said housing or at least partially on an outer surface thereof;
   a prop attached to said housing and positioned to interact with the sensation from said at least one source of sensation, wherein said prop is a device or structure shaped to evoke an appearance of an object subject to the hazardous condition, and wherein when said source of sensation is activated to emit said sensation, the sensation and said prop cooperate to simulate that the prop is subject to the hazardous condition; and
   a controller adapted to automatically vary the sensation in response to the simulated or the actual suppressant detected by the at least one sensor, wherein the controller is adapted to automatically vary the sensation in response to the manner in which the simulated or the actual suppressant is applied.

2. The simulator as recited in claim 1, wherein the simulator further comprises a display panel adapted to visually display the hazardous condition, wherein said display panel and said at least one source of sensation are both coupled to said housing to form a simulator system.

3. The simulator as recited in claim 2, wherein the controller is further adapted to automatically vary a visual display of the hazardous condition on the display panel in response to the suppressant detected by the at least one sensor.

4. The simulator as recited in claim 1, wherein the hazardous condition comprises at least one of fire, smoke, sparks, steam leak, flammable gas leak, toxic fluid leak, hazardous fluid leak, and oxidizing gas leak.

5. The simulator recited in claim 1, wherein the sensation comprises at least one of light, sound, smoke, sparks, fluid, heat, solid material, and smell.

6. The simulator recited in claim 1, wherein the at least one sensor is adapted to detect at least one of an audible signal, an electromagnetic signal, an ultrasonic signal, a pressure signal, a heat signal, a particle signal, a fluid signal, and a gas vapor signal.

7. The simulator recited in claim 1, wherein the prop comprises at least one of a device, machinery, hardware, furniture, a container, and an enclosure.

8. The simulator recited in claim 7, wherein the device comprises at least one of a motor, an engine, a pump, a generator, a stove, and a storage drum.

9. The simulator recited in claim 7, wherein the container comprises at least one of a box, a can, a trashcan, and a stove pot.

10. The simulator recited in claim 7, wherein the enclosure comprises at least one of a cabinet, a shelf, a locker, a wall section, a roof section, a window, and an electrical enclosure.

11. The simulator recited in claim 7, wherein the hardware comprises at least one of a pipe, a pipe flange, and a valve, a manifold, a pipe sensor, a hose, and a cable.

12. The simulator recited in claim 7, wherein the container comprises a cylindrical container having a bottom and an open top, and wherein the at least one sensor is positioned at the bottom of the cylindrical container and is accessible only from the open top of the container.

13. The simulator recited in claim 1, wherein the simulator further comprises at least one of a simulated electric control panel, a simulated pull station, simulated room lighting, a simulated sprinkler, a simulated gas shutoff valve, a simulated alarm, simulated heat, a simulated door, and a simulated phone.

14. The simulator recited in claim 1, wherein the controller is adapted to automatically reduce the sensation when the at least one sensor senses that the simulated or the actual suppressant is applied using proper fire suppressant technique.

15. The simulator as recited in claim 1, wherein said sensation is detectable by a trainee positioned externally of said housing who is positioned to apply the simulated or actual hazardous condition suppressant detected by said at least one sensor.

16. The simulator as recited in claim 1, wherein the at least one sensor is adapted to detect an actual hazardous condition suppressant.

17. The simulator as recited in claim 2, wherein said prop is positioned immediately adjacent to said display panel such that a visual display of the hazardous condition appears to emanate from said prop by way of said display panel.

18. The simulator as recited in claim 1, wherein said prop is removably attached to said housing.

19. The simulator as recited in claim 18, wherein the prop comprises a plurality of props interchangeably mounted to the housing.

20. The simulator as recited in claim 1, wherein said controller is positioned within said interior compartment of said housing.

21. The simulator as recited in claim 1, further comprising a supplementary sensor directly coupled to said prop.

22. The simulator as recited in claim 21, wherein said supplementary sensor is positioned within said prop.

23. A hazard suppression training method comprising:
   providing a hazard suppression training simulator including a housing having an interior compartment, at least one source of sensation adapted to emit a sensation representative of a hazardous condition, at least one sensor adapted to detect a simulated or an actual hazardous condition suppressant, the sensor positioned at least partially within said interior compartment of said housing or at least partially on an outer surface thereof, and a prop attached to said housing, wherein said prop is a device or structure shaped to evoke an appearance of an object subject to the hazardous condition;

emitting, via the at least one source of sensation, the sensation of a simulated hazardous condition externally to said interior compartment of the housing, wherein said sensation and said prop cooperate to simulate that the prop is subject to the hazardous condition;

sensing, via the at least one sensor, a simulated or actual hazard suppressant directed toward the prop; and automatically modifying the provided sensation of the simulated hazardous condition in response to the suppressant detected by the at least one sensor.

24. The method as recited in claim 23, wherein the simulated hazardous condition suppressant comprises one of a simulated fire extinguisher, a simulated fire hose, and a simulated fire blanket.

25. The method as recited in claim 23, wherein the actual hazardous condition suppressant comprises one of a fire extinguisher, a fire hose, and a fire blanket.

26. The method as recited in claim 23, wherein the actual hazardous condition suppressant comprises at least one of water, carbon dioxide, Halon, a cloth, a powdered chemical, a foam, an aerosol, or air.

27. The method as recited in claim 23, wherein the simulated hazardous condition suppressant comprises at least one of an audible signal, an electromagnetic signal, an ultrasonic signal, a pressure signal, a heat signal, a particle signal, a fluid signal, or a gas vapor signal.

28. The method as recited in claim 23, wherein the modifying step includes modifying emission of the sensation in response to the manner in which the simulated or the actual suppressant is applied as detected by the at least one sensor.

29. The method as recited in claim 23, wherein the modifying step includes reducing emission of the sensation when the at least one detector detects that the suppressant is applied using proper fire suppressant techniques.

30. The method as recited in claim 23, wherein said simulated or actual hazard suppressant sensed during said sensing step is directed toward the simulator by a trainee positioned externally of said housing.

31. The method as recited in claim 23, wherein said hazard suppression training simulator further comprises a display panel adapted to visually display the hazardous condition, wherein said display panel is coupled to said housing to form a simulator system, and wherein said prop is positioned adjacent to said display panel such that a visual display of said hazardous condition appears to emanate from said prop by way of said display panel.

32. A hazard suppression training simulator comprising:
a three-dimensional housing defining an interior compartment, wherein said housing further includes a prop shaped to evoke an appearance of an object to be subjected to a hazardous condition;
at least one source of sensation coupled to said housing and adapted to emit a sensation externally of said housing, wherein said sensation is representative of the hazardous condition, and wherein the sensation and the housing cooperate to simulate that the object to be subjected to the hazardous condition is subject to the hazardous condition;
at least one sensor coupled to said housing and adapted to detect a simulated or an actual hazardous condition suppressant applied to said housing externally of said interior compartment; and
a controller adapted to automatically vary the sensation in response to the simulated or the actual suppressant detected by the at least one sensor, wherein the controller is adapted to automatically vary the sensation in response to the manner in which the simulated or the actual suppressant is applied.

33. The simulator as recited in claim 32, wherein at least one of the sensor and the source of sensation is positioned within the interior compartment.

34. The simulator as recited in claim 32, wherein the controller is positioned within the interior compartment.

35. The simulator as recited in claim 32, wherein the simulator further comprises a display panel adapted to visually display the hazardous condition, wherein said display panel and said at least one source of sensation are both coupled to said housing to form a simulator system, and wherein said housing is positioned immediately adjacent to said display panel such that a visual display of the hazardous condition appears to emanate from said housing by way of said display panel.

36. The hazard suppression training simulator as recited in claim 32, wherein said housing is manually carryable.

* * * * *